US010781272B2

(12) United States Patent
Choi et al.

(10) Patent No.: US 10,781,272 B2
(45) Date of Patent: Sep. 22, 2020

(54) PROCESS FOR RECOVERY OF RESIDUAL HYDROGENATION CATALYST FROM HYDROGENATED NITRILE RUBBER SOLUTION

(71) Applicant: Zeon Chemicals, LP, Louisville, KY (US)

(72) Inventors: Soobum Choi, Louisville, KY (US); Lawrence J. Justice, Louisville, KY (US); Mahesh Datla, Friendswood, TX (US); Mike Recchio, Louisville, KY (US)

(73) Assignee: Zeon Chemicals, LP, Louisville, KY (US)

(*) Notice: Subject to any disclaimer, the term of this patent is extended or adjusted under 35 U.S.C. 154(b) by 0 days.

(21) Appl. No.: 16/225,399

(22) Filed: Dec. 19, 2018

(65) Prior Publication Data

US 2019/0119411 A1    Apr. 25, 2019

Related U.S. Application Data

(63) Continuation of application No. PCT/US2016/038679, filed on Jun. 22, 2016.

(51) Int. Cl.
| C08F 6/06 | (2006.01) |
| C08C 2/04 | (2006.01) |
| C08L 15/00 | (2006.01) |
| B01J 38/52 | (2006.01) |
| C08F 6/02 | (2006.01) |
| C08F 6/22 | (2006.01) |
| C08F 8/04 | (2006.01) |

(Continued)

(52) U.S. Cl.
CPC .............. *C08F 6/06* (2013.01); *B01J 38/52* (2013.01); *C08C 2/04* (2013.01); *C08F 6/02* (2013.01); *C08F 6/22* (2013.01); *C08F 8/04* (2013.01); *C08F 20/44* (2013.01); *C08L 15/005* (2013.01); *B01D 2251/90* (2013.01); *B01J 38/74* (2013.01)

(58) Field of Classification Search
CPC ............. C08F 6/06; C08L 15/005; C08C 2/04
See application file for complete search history.

(56) References Cited

U.S. PATENT DOCUMENTS

| 4,857,632 A * | 8/1989 | Ahlberg | C08C 2/02 528/487 |
| 4,985,540 A * | 1/1991 | Bradford | C08C 2/04 210/688 |
| 2009/0027444 A1 * | 1/2009 | Yoshida | B41J 2/16523 347/29 |

FOREIGN PATENT DOCUMENTS

| CN | -104592423 A * | 5/2015 |
| EP | 2072533 A1 | 6/2009 |

OTHER PUBLICATIONS

International Search Report and Written Opinion dated Nov. 15, 2016 for International Application No. PCT/US2016/038679, 9 pages.

(Continued)

*Primary Examiner* — Melissa S Swain
(74) *Attorney, Agent, or Firm* — Frost Brown Todd LLC

(57) ABSTRACT

Residual hydrogenation catalyst produced from reduction of nitrile rubber is recovered by a chelation step using a chelating agent and a series of extraction using semi-coagulation with polar solvents and an optional washing steps for the separation of catalyst-chelating agent complex (Continued)

from hydrogenated nitrile rubber solution. The chelating agent is selected from xanthate, dithiocarbamate, and trithiocarbonate compounds.

15 Claims, 2 Drawing Sheets

(51) Int. Cl.
*C08F 20/44* (2006.01)
*B01J 38/74* (2006.01)

(56) References Cited

OTHER PUBLICATIONS

International Preliminary Report on Patentability dated Dec. 25, 2018 for International Application No. PCT/US2016/038679, 6 pages.
Xing, Hai Lin, et al. "Remove rhodiu, catalysts from HBBR solution." Advanced Materials Research. vol. 311. Trans Tech Publications, 2011.
Yang, Lijuan, Qinmin Pan, and Garry L. Rempel. "Development of a green separation technique for recovery of Wilkinson's catalysts from bulk hydrogenated nitrile butadience rubber." Catalysis today 207 (2013): 153-161.

* cited by examiner

PROCESS FOR RECOVERY OF RESIDUAL HYDROGENATION CATALYST FROM HYDROGENATED NITRILE RUBBER SOLUTION

The present technology relates to a process for recovery of residual hydrogenation catalyst from hydrogenated nitrile rubber solution.

BACKGROUND

While acrylonitrile-butadiene copolymer (NBR) is used broadly in rubber industry, it has limited heat resistance, oil resistance, and weather resistance. To improve the characteristics of NBR, hydrogenation of NBR in an organic solvent using either a homogeneous catalyst such as a rhodium catalyst or a heterogeneous catalyst such as a silica supported palladium catalyst, is used. The resulting partially or highly saturated acrylonitrile-butadiene copolymer or the fully hydrogenated nitrile rubber is called as HNBR.

After hydrogenation of NBR with the homogeneous or heterogeneous catalyst in an organic solvent, there are a few issues for the residual catalyst in the HNBR. The first is the high price of catalyst compared to the HNBR price. The second is the adverse properties such as the dark color. The third is the limitation of the special transition metal in the earth. The forth is the possibly environmental issue. Therefore, many recovery methods have been developed for the residual catalysts in the hydrogenated nitrile rubber which is made from the homogeneous hydrogenation methods or the heterogeneous hydrogenation methods of nitrile rubber.

Currently there are two main hydrogenation catalyst recovery methods. One method is to use the precipitation and the separation of the residual hydrogenation catalyst from the polymer solution by means of chemical reaction with various additives including acid/base and/or oxidant. The applied acids/base may present a variety of forms involving aqueous solution of acids/base, ion exchange resins having acidic/basic functionalities, and amphoteric hydrate of alumina. Another method is the adsorption via solid materials for recovery of organometallic catalysts from polymer solution. A wide spectrum of materials may be used as absorbents including silica, crosslinked polymers, inorganic porous material, and hybrid materials of two or three of them. Generally, the process involves passing the polymer solution through a column packed with the absorbent or mixing the absorbent with the solution followed by filtration or decanting.

But precipitation and adsorption methods as two principal catalyst recovery techniques that employed in solution hydrogenation process suffer from their respective drawbacks. The precipitation process carries high risk to contaminate the final product if the additives that used for precipitation of the catalyst were not completely removed, particularly for a process involving HNBR solution of high viscosity. The adsorption process involves a large amount of resin and related recycle/regeneration operation, which extends the time of a whole process and causes an increase of the expense. Furthermore, at the end of its recycle times, the resin is generally buried or dumped in an open air, which becomes an environmental concern.

The present inventors worked to solve the problems described above, i.e., high catalyst recovery from the hydrogenated nitrile rubber solution without contaminating impurities in the polymer, without using special oxidizing agent, with the simple catalyst extraction method, and with the high efficiency of the chelating agent. An object of the technology is to provide a process for recovery of residual hydrogenation catalyst from hydrogenated nitrile rubber solution.

BRIEF SUMMARY

The above object of the technology is the recovery of the residual hydrogenation catalyst from the hydrogenated nitrile rubber solution using (1) chelation step with chelating agent, (2) extraction step with semi-coagulation (or partial coagulation) using the polar solvent for the separation of chelating agent-palladium complex from hydrogenated nitrile rubber, and optionally (3) washing step to extract the residual chelating agent-catalyst complex from hydrogenated nitrile rubber. The chelating agent for the chelation step is selected from a xanthate compound, a dithiocarbamate compound, and a trithiocarbonate compound. Semi-coagulation (or partial coagulation) for the extraction step is controlled by the amount of water added to the hydrogenated nitrile rubber solution for the effective separation of the catalyst-chelating agent complex from hydrogenated nitrile rubber in the solution. The washing step is composed of dissolving the partially coagulated hydrogenated nitrile rubber into the fresh solvent with a partial coagulation step using water for further separation of the catalyst-chelating agent complex from the hydrogenated nitrile rubber in the solution.

This removal of the hydrogenation catalyst residue from hydrogenated nitrile rubber solution produces catalyst-free hydrogenated nitrile rubber and uses a chelation step, extraction step and optional washing step. This technology overcomes the problem of impurities in hydrogenated nitrile rubber, and the problem of the high cost for recovery of residual hydrogenation catalyst from hydrogenated nitrile rubber solution.

DETAILED DESCRIPTION

Figure 1:
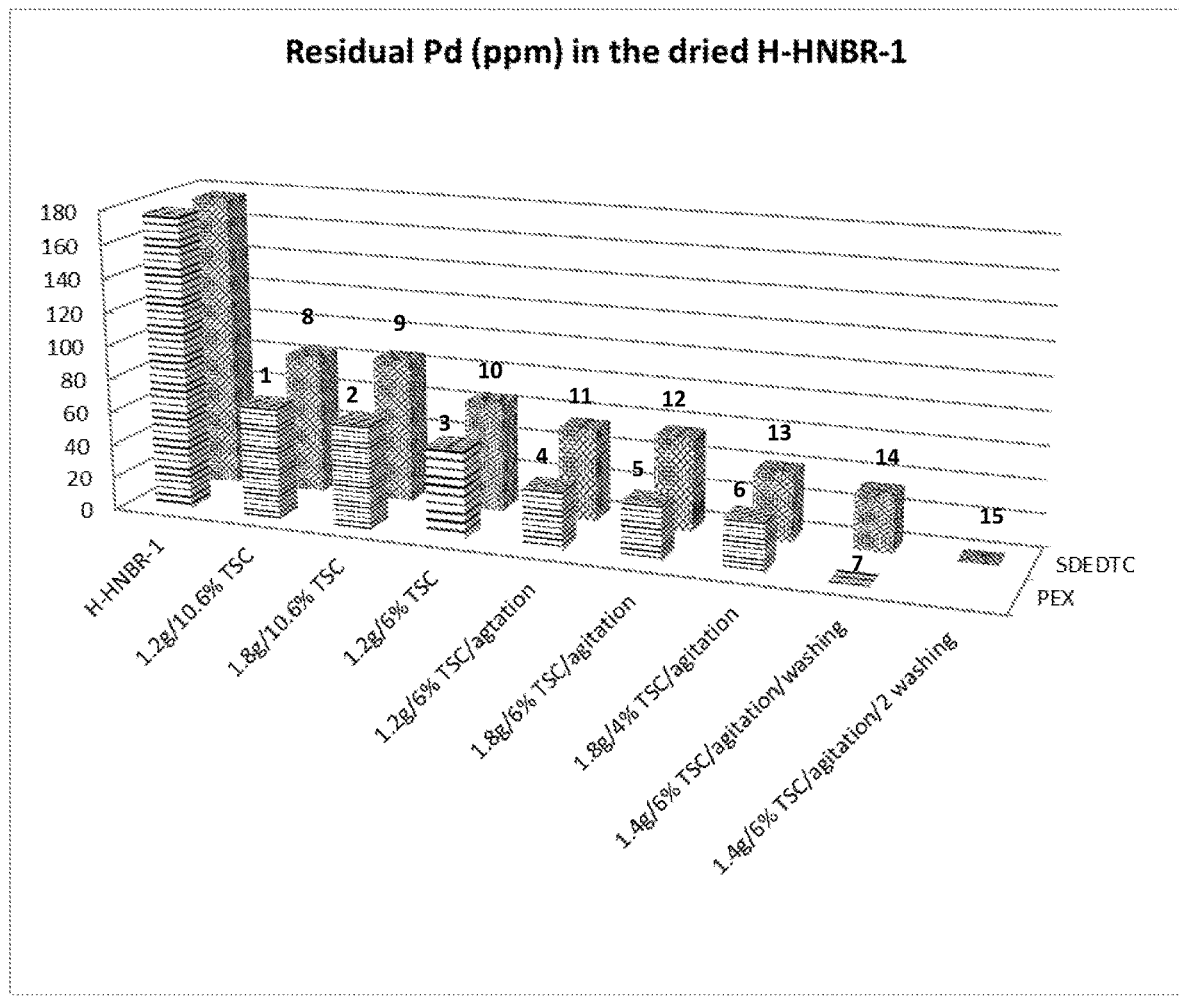
FIG. 1 is a graph of residual palladium in the dried H-HNBR-1 after treating with PEX or SDEDTC under different TSC, different mixing method, and different semi-coagulation/washing steps for Example 1-15.

The object of this technology is the recovery of residual hydrogenation catalyst from a hydrogenated nitrile rubber solution using (1) a chelation step with chelating agent, (2) an extraction step with semi-coagulation (or partial coagulation) using a polar solvent for the separation of the chelating agent-palladium complex from hydrogenated nitrile rubber, and, optionally (3) a washing step to further extract the residual chelating agent-catalyst complex from hydrogenated nitrile rubber. The chelating agent for the chelation step is selected from xanthate compounds, dithiocarbamate compounds, and trithiocarbonate compounds. The semi-coagulation (or partial coagulation) extraction step is controlled the volume of water used to treat the hydrogenated nitrile rubber solution for the effective separation of catalyst-chelating agent complex from hydrogenated nitrile rubber in the solution. The washing step is composed of dissolving the partially coagulated hydrogenated nitrile rubber into the fresh solvent and a partial coagulation step with water for extra separation of catalyst-chelating agent complex from hydrogenated nitrile rubber in the solution.

This hydrogenation catalyst residue removal process from hydrogenated nitrile rubber solution produces catalyst free hydrogenated nitrile rubber using the chelation/extraction step and washing step. This technology overcomes the problem of having impurities in hydrogenated nitrile rubber, and the high cost for recovery of residual hydrogenation catalyst.

Hydrogenated nitrile rubber solution may be prepared with heterogeneous catalyst or homogeneous catalyst in a solution under a hydrogenation atmosphere. The reaction of the hydrogenation of nitrile rubber in solution results in a reduction of at least 80% of the original carbon-carbon double bonds contained in an unsaturated nitrile rubber. The nitrile rubber content in the solution is typically 2-50% depending on the catalyst type, the mixing efficiency, and the target saturation degree. The catalyst used for the hydrogenation of the nitrile rubber is either a homogeneous or heterogeneous catalyst. Hydrogenated nitrile rubber solution is included in hydrogenated acrylonitrile-butadiene copolymer solution, hydrogenated acrylonitrile-acrylate-butadiene terpolymer solution, hydrogenated acrylonitrile-butadiene-methacrylic acid terpolymer solution. When the heterogeneous catalyst is used in solution, some of catalyst may be separated by using filtration or centrifugation before. The present technology is related to the recovery of the residual catalyst from the hydrogenated nitrile rubber in solution.

(1) Chelation Step

In the present technology, the chelation step comprises the formation of a chelating agent-palladium complex from the free palladium in solution, or the fixed palladium which is attached to the hydrogenated nitrile rubber, by using a strong chelating agent such as xanthate compound, dithiocarbamate compound, or trithiocarbonate compound, below about 13% by weight of the hydrogenated nitrile rubber in the solution.

The general chemical structure of the chelating agent for forming the chelation agent-palladium complex from the hydrogenated nitrile rubber solution is shown below:

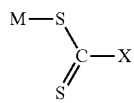

Where $X=-NR_2$ for dithiocarbamate compound, $X=-OR$ for xanthate compound, and $X=-SR$ for trithiocarbonate compound.

Where M is counter ion and R is alkyl group or benzyl group. Counter ion is sodium, potassium, ammonium, or diethyl ammonium. Alkyl group is methyl, ethyl, butyl, or isobutyl.

The xanthate compounds in the chemical structure are potassium ethyl xanthate (PEX), sodium isobutyl xanthate (SIBX), and sodium isopropyl xanthate (SIPX). The dithiocarbamate compounds in the chemical structure are sodium dimethyldithiocarbamate (SDMDTC), sodium diisobutyldithiocarbamate (SDIBDTC), sodium diethyldithiocarbamate (SDEDTC), sodium dibutyldithiocarbamate (SDBDTC), diethylamomonium diethyldithiocarbamate, sodium dibenzyldithiocarbamate, and ammonium diethyldithiocarbamate (ADEDTC). The trithiocarbonate compound is sodium trithiocarbonate.

Chelating agents for the chelation step may be used alone or in combination with two or more of the chelating agents listed above. The chelating agent may be used in the solid state or the solution state such as Aquamet M which is about 25% of sodium dimethyldithiocarbamate in the aqueous solution and Aquamet E which is about 25% of sodium diethyldithiocarbamate in the aqueous solution from Akzo Nobel Surface Chemistry LLC. The amount of chelating agent for the chelation step depends upon the residual catalyst level in the hydrogenated nitrile rubber, the chelating agent, the amount of hydrogenated nitrile rubber in the solution, the amount of residual metal in the solution, chelation time, mixing efficiency, solvent type for the chelation step, and the type of hydrogenated nitrile rubber. One amount of chelating agent which may be used is more than about 2 moles of chelating agent based on 1 mole of the catalyst in the hydrogenated nitrile rubber.

In the chelation step, the amount of hydrogenated nitrile rubber in the solution is related to the chelation efficiency. Suitable hydrogenated nitrile rubber content in the solution may range from about 1% to about 20%, by weight, and from about 2% to about 13% by weight, and also from about 4% to about 11% by weight.

Another factor for mixing efficiency is the method of mixing, such as by shaking or agitation. Depending on mixing method, the chelation efficiency may be improved. Agitation is effective. Elevated temperatures also affect chelation efficiency, and are solvent dependent.

In the chelation step, the organic solvent used for dissolving hydrogenated nitrile rubber may also be the same solvent used for the hydrogenation process of nitrile rubber, or it may be a partially or completely water-miscible solvent. Suitable organic solvents include ketones such as acetone, methyl ethyl ketone, diethyl ketone, and methyl isopropyl ketone. Acetone is a particularly preferred organic solvent.

In the chelation step, the chelating agent may be added alone or by using the mixture with organic solvent or the mixture with polar solvent such as water, methanol, ethanol, and isopropanol or the mixture with organic solvent and polar solvent. The preferred polar solvent is water.

Without being bound by theory, it is thought that the small volume of water and chelating agent may help the migration of chelating agent from the solution to the hydrogenated nitrile rubber because chelating agent has better solubility in water than acetone. The amount of water and chelating agent used may be lower than that for full coagulation. If the amount of water and chelating agent is higher than that for full coagulation, a lot of residual palladium and chelating agent-palladium complexes will be trapped in the coagulant of the hydrogenated nitrile rubber.

(2) Extraction Step With Semi-Coagulation

After chelation, the extraction step with semi-coagulation (or partial coagulation) using a polar solvent is used for the separation of chelating agent-palladium complex from hydrogenated nitrile rubber. Without the semi-coagulation after chelation step, the extraction of chelating agent-palladium complex from the hydrogenated nitrile rubber may be difficult. If a full coagulation is conducted after chelation step, a lot of the chelating agent-palladium complex is trapped in the coagulated hydrogenated nitrile rubber. Therefore, a semi-coagulation is required. The polar solvent should encourage coagulation of the hydrogenated nitrile rubber from the chelated solution. Suitable polar solvents may include water, methanol, ethanol, isopropanol, and mixtures thereof. A polar solvent which may be used is water when the solvent for the chelation step is acetone. A polar solvent for semi-coagulation may be used alone or a mixture of polar solvent and acetone may be used. The amount of the polar solvent for semi-coagulation is related to the total solid content (TSC) of the chelated solution, the composition of the hydrogenated nitrile rubber, and the polymer type of the base nitrile rubber such as copolymer or terpolymer. The typical amount of the polar solvent for semi-coagulation may be from about 0.1% to about 20% by weight, or from about 0.5% to 10% by weight, or from about 1% to about 5%, by weight, based on the chelated solution.

After extracting and separating the chelating agent-palladium complex from the hydrogenated nitrile rubber solution by using a semi-coagulation process with a polar solvent, the palladium-extracted liquid which includes the chelating agent-palladium complex and the residual hydrogenated nitrile rubber is separated from the semi-coagulated hydrogenated nitrile rubber (HNBR) by decanting or filtering or using a common solid-liquid separation method such as centrifugation.

(3) Washing Step

The semi-coagulated HNBR may be dissolved in the same type of solvent which was used for the chelation step. The main purpose of the washing step is to extract the residual chelating agent-palladium complex from the semi-coagulated HNBR. An amount of solvent for dissolving the semi-coagulated HNBR may be added to the semi-coagulated HNBR to make a dilute solution having the solid (HNBR) content from about 1% to about 20% by weight, or from about 2% to about 13% by weight, or from about 4% to 11% by weight. Another advantage of the washing step is the reduction of the residual chelating agent in the HNBR product.

After dissolving the semi-coagulated HNBR in a solvent, semi-coagulation with a polar solvent may be used to separate the extracted chelating agent-palladium complex in the solution from the semi-coagulated HNBR. The semi-coagulation step with the polar solvent is followed by same procedure as the semi-coagulation method after the chelation step.

Depending on the residual palladium level in the hydrogenated nitrile rubber, the second washing step may be used to obtain palladium-free hydrogenated nitrile rubber. The second washing step is the same procedure as the first washing step.

After semi-coagulation from the first washing step or the second washing step, the semi-coagulated HNBR may be fully coagulated after mixing with the semi-coagulated residual HNBR which is precipitated from the palladium-extracted liquid, by adding an excess amount of water. The palladium-extracted liquid is obtained from the chelation step and subsequent washing steps.

After full coagulation of the semi-coagulated HNBR and the semi-coagulated residual HNBR mixture, the final product may be obtained by typical drying methods.

The residual palladium in the final hydrogenated nitrile rubber may be measured by using ICP (Inductively Coupled Plasma Argon Emission Spectroscopy).

The palladium extracted from the hydrogenated nitrile rubber solution may be recovered from distillation of the solvent or micro-filtration. After distillation, the dark black residue is included chelating agent-palladium complex and some impurities. After more purification of the residue by using calcination, the purified palladium is obtained.

The technology will be described in more detail by reference to the following detailed examples and the present technology is not restricted by the examples.

EXAMPLE 1-7

Figure 2:
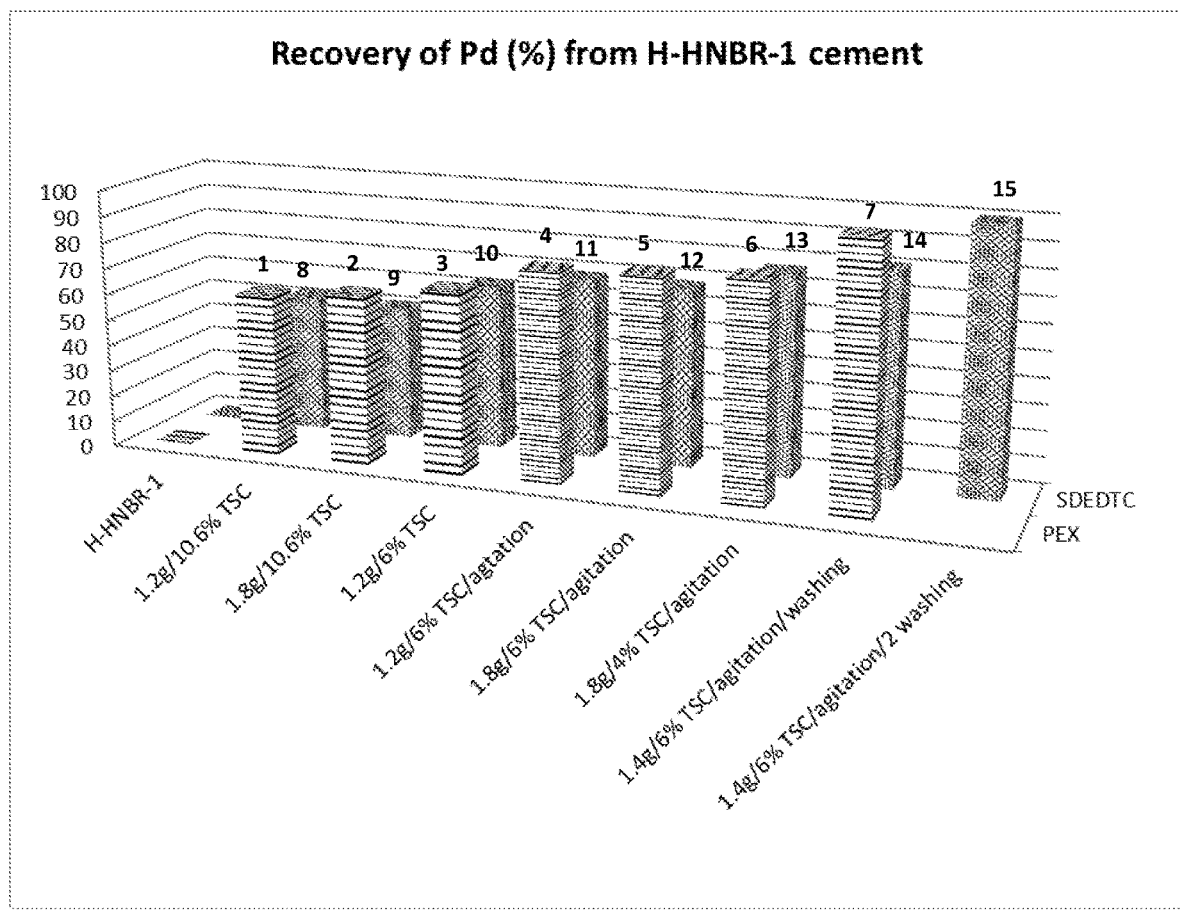
FIG. 2 is a graph for recovery of palladium from H-HNBR-1 cements after treating with PEX or SDEDTC under different TSC, different mixing method, and different semi-coagulation/washing steps for Example 1-15.

In Example 7 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of the palladium was recovered in the silica supported state. To measure residual palladium in H-HNBR-1 cement after recovering most of the silica supported palladium, H-HNBR-1 cement was fully coagulated with an excess amount of water and dried. The dried H-HNBR-1 was shown 176.7 ppm of residual palladium by using ICP. 100 g of H-HNBR-1 cement having 176.7 ppm of residual palladium and 12.0% of solid by weight was placed in 1 liter of glass jar attached with an agitator. 96 g of acetone, 1.5 g of water, and 1.4 g of potassium ethyl xanthate (PEX) were mixed and added to the H-HNBR-1 cement. The total solid content was 6% by weight. After adding the chelating agent (PEX) solution, the chelation reaction was conducted for 15 hours. At the end of the chelation reaction, 7.1 g of water was slowly added to make semi-coagulation (or partial coagulation). After decanting 153 g of palladium-extracted liquid part, 90 g of acetone was added to wash the semi-coagulated polymer. The semi-coagulated polymer was completely dissolved in acetone with agitation. After completely dissolving the semi-coagulated polymer, small amount of water was added to separate the semi-coagulated polymer again. After decanting the polymer-washed liquid, the semi-coagulated polymer was added to an excess amount of water for the complete coagulation. After filtering and drying the completely coagulated polymer, the dried polymer was obtained. The dried polymer was analyzed the residual palladium using ICP (Inductively Coupled Plasma Argon Emission Spectroscopy). The residual palladium of the dried H-HNBR-1 polymer was 0 ppm. The results are shown in Table 1 and FIGS. 1-2.

Example 6 was prepared according to the same procedure as Example 7 except the chelation step and no washing step. The chelation step was conducted with 1.8 g of PEX, 200 g of acetone, and 1.5 g of water under agitation for 17 hours. After the chelation step, 9.4 g of water was added for the semi-coagulation. The residual palladium of the dried H-HNBR-1 polymer was 30.3 ppm. The results are shown in Table 1 and FIGS. 1-2.

Example 5 was prepared according to the same procedure as Example 7 except chelation step and no washing step. The chelation step was conducted with 1.8 g of PEX, 96 g of acetone, and 1.5 g of water under agitation for 15 hours. After the chelation step, 5.9 g of water was added for the semi-coagulation. The residual palladium of the dried H-HNBR-1 polymer was 33.4 ppm. The results are shown in Table 1 and FIGS. 1-2.

Example 4 was prepared according to the same procedure as Example 7 except chelation step and no washing step. The chelation step was conducted with 1.2 g of PEX, 96 g of acetone, and 1.5 g of water under agitation for 15 hours. After the chelation step, 5.9 g of water was added for the semi-coagulation. The residual palladium of the dried H-HNBR-1 polymer was 35.3 ppm. The results are shown in Table 1 and FIGS. 1-2.

Example 3 was prepared according to the same procedure as Example 4 except shaking during chelation and washing steps. The chelation step was conducted with 1.2 g of PEX, 100 g of acetone, and 1.8 g of water under agitation for 15 hours. After the chelation step, 5.9 g of water was added for the semi-coagulation. The residual palladium of the dried H-HNBR-1 polymer was 53.9 ppm. The results are shown in Table 1 and FIGS. 1-2.

Example 2 was prepared according to the same procedure as Example 3 except chelation step. The chelation step was conducted with 1.8 g of PEX, 10 g of acetone, and 1.2 g of water under agitation for 15 hours. After the chelation step, 5.9 g of water was added for the semi-coagulation. The residual palladium of the dried H-HNBR-1 polymer was 62.1 ppm. The results are shown in Table 1 and FIGS. 1-2.

Example 1 was prepared according to the same procedure as Example 2 except chelation step. The chelation step was conducted with 1.2 g of PEX, 11 g of acetone, and 1.2 g of water under agitation for 15 hours. After the chelation step, 5.9 g of water was added for the semi-coagulation. The residual palladium of the dried H-HNBR-1 polymer was 67.3 ppm. The results are shown in Table 1 and FIGS. 1-2.

EXAMPLE 8-15

In Example 15 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of the palladium was recovered in the silica supported state. After fully coagulation with an excess amount of water and drying, 176.7 ppm of residual palladium was existed in the H-HNBR-1. 100 g of H-HNBR-1 cement having 176.7 ppm of residual palladium and 12.0% of solid by weight was placed in 1 liter of glass jar attached with an agitator. 96 g of acetone and 1.4 g of sodium diethyldithiocarbamate (SDEDTC) were mixed and added to the H-HNBR-1 cement. The total solid content was 6.1% by weight. After adding chelating agent (SDEDTC) solution, the chelation reaction was conducted for 15 hours. At the end of chelation reaction, 5.3 g of water was slowly added to cause semi-coagulation (or partial coagulation). After decanting 153 g of palladium extraction liquid part, 90 g of acetone was added to wash the semi-coagulated polymer. The semi-coagulated polymer was completely dissolved in acetone with agitation. After completely dissolving the semi-coagulated polymer, 5.3 g of water was added to cause semi-coagulation again. The first polymer-washed liquid was decanted and the second washing step was conducted using the same amount of acetone and water. After decanting the second polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-1 polymer was 0 ppm. The results are shown in Table 2 and FIGS. 1-2.

Example 14 was prepared according to the same procedure as Example 15 except no the second washing step and the different water amount for the semi-coagulation after the chelation step. After the chelation step, 7.1 g of water was added for the semi-coagulation. The residual palladium of the dried H-HNBR-1 polymer was 33.7 ppm. The results are shown in Table 2 and FIGS. 1-2.

Example 13 was prepared according to the same procedure as Example 15 except the chelation step and no washing step. The chelation step was conducted after adding 1.8 g of SDEDTC and 235 g of acetone to 100 g of H-HNBR-1cement under agitation for 17 hours. After the chelation step, 9.4 g of water was added for the semi-coagulation. The residual palladium of the dried H-HNBR-1 polymer was 40.9 ppm. The results are shown in Table 2 and FIGS. 1-2.

Example 12 was prepared according to the same procedure as Example 15 except chelation step and no washing step. The chelation step was conducted after adding 1.8 g of SDEDTC and 96 g of acetone to 100 g of H-HNBR-1 cement under agitation for 15 hours. After the chelation step, 5.9 g of water was added for the semi-coagulation. The residual palladium of the dried H-HNBR-1 polymer was 56.1 ppm. The results are shown in Table 2 and FIGS. 1-2.

Example 11 was prepared according to the same procedure as Example 15 except chelation step and no washing step. The chelation step was conducted after adding 1.2 g of SDEDTC and 96 g of acetone to 100 g of H-HNBR-1 cement under agitation for 15 hours. After the chelation step, 5.9 g of water was added for the semi-coagulation. The residual palladium of the dried H-HNBR-1 polymer was 55.4 ppm. The results are shown in Table 2 and FIGS. 1-2.

Example 10 was prepared according to the same procedure as Example 11 except shaking during chelation. The chelation step was conducted with 1.2 g of SDEDTC, 100 g of acetone, and 0.6 g of water under shaking for 15 hours. After the chelation step, 5.9 g of water was added for the semi-coagulation. The residual palladium of the dried H-HNBR-1 polymer was 65.4 ppm. The results are shown in Table 2 and FIGS. 1-2.

Example 9 was prepared according to the same procedure as Example 11 except shaking during chelation. The chelation step was conducted with 1.8 g of SDEDTC and 21 g of acetone under shaking for 15 hours. After the chelation step, 5.9 g of water was added for the semi-coagulation. The residual palladium of the dried H-HNBR-1 polymer was 86.4 ppm. The results are shown in Table 2 and FIGS. 1-2.

Example 8 was prepared according to the same procedure as Example 11 except shaking during chelation. The chelation step was conducted with 1.2 g of SDEDTC and 17 g of acetone under shaking for 15 hours. After the chelation step, 5.9 g of water was added for the semi-coagulation. The residual palladium of the dried H-HNBR-1 polymer was 83.6 ppm. The results are shown in Table 2 and FIGS. 1-2.

EXAMPLE 16-17

In Example 16 a partially hydrogenated acrylonitrile-butadiene rubber solution (the intermediate HNBR product which was provided from Zeon Chemicals LP: P-HNBR-1 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in P-HNBR-1 cement after recovering most of the silica supported palladium, P-HNBR-1 cement was fully coagulated with an excess amount of water and dried. The dried P-HNBR-1 was shown to contain 42.3 ppm of residual palladium by using ICP method. 100 g of P-HNBR-1 cement having 42.3 ppm of residual palladium and 13.9% of solid by weight was placed in 1 liter of glass jar attached with an agitator. 129 g of acetone, 1.0 g of water, and 0.6 g of potassium ethyl xanthate (PEX) were mixed and added to the P-HNBR-1 cement. The total solid content was 6% by weight. After adding chelating agent (PEX) solution, the chelation reaction was conducted for 17 hours. At the end of chelation reaction, 8 g of water was slowly added to cause semi-coagulation (or partial coagulation). After decanting the palladium-extracted liquid part, 106 g of acetone was added to wash the semi-coagulated polymer. The semi-coagulated polymer was completely dissolved in acetone with agitation. After completely dissolving the semi-coagulated polymer, small amount of water was added to separate the semi-coagulated polymer again. After decanting the polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried P-HNBR-1 polymer was 0 ppm. The results are shown in Table 3.

In Example 17 a partially hydrogenated acrylonitrile-butadiene rubber solution (the intermediate HNBR product which was provided from Zeon Chemicals LP: P-HNBR-1 cement) was made with heterogeneous catalyst (silica-supported palladium) in acetone. After finishing the hydrogenation with heterogeneous catalyst under hydrogen at high pressure, most of the palladium was recovered in the silica supported state. After fully coagulation with an excess amount of water and drying, 42.3 ppm of residual palladium was existed in the P-HNBR-1. 100 g of P-HNBR-1 cement having 42.3 ppm of residual palladium and 13.9% of solid by weight was placed in 1 liter of glass jar attached with an agitator. 129 g of acetone and 0.6 g of sodium diethyldithiocarbamate (SDEDTC) were mixed and added to a P-HNBR-1 cement. The total solid content was 6% by weight. After adding chelating agent (SDEDTC) solution, the chelation reaction was conducted for 17 hours. At the end of the chelation reaction, 8 g of water was slowly added to cause semi-coagulation (or partial coagulation). After decanting the palladium-extracted liquid part, 106 g of acetone was added to wash the semi-coagulated polymer. The semi-coagulated polymer was completely dissolved in acetone with agitation. After completely dissolving the semi-coagulated polymer, small amount of water was added to separate the semi-coagulated polymer again. After decanting the polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried P-HNBR-1 polymer was 0 ppm. The results are shown in Table 3.

EXAMPLE 18-23

In Example 18 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of the palladium was recovered in the silica supported state. To measure residual palladium in H-HNBR-1 cement after recovering most of the silica supported palladium, H-HNBR-1 cement was fully coagulated with excess amount of water and dried. The dried H-HNBR-1 was shown 176.7 ppm of residual palladium by using ICP method. 300 g of H-HNBR-1 cement having 176.7 ppm of residual palladium and 12.0% of solid by weight was placed in 1 liter of glass jar attached with an agitator. 300 g of acetone and 4.3 g of sodium diethyldithiocarbamate (SDEDTC) were mixed and added to the H-HNBR-1 cement. The total solid content was 6.0% by weight. After adding chelating agent (SDEDTC) solution, the chelation reaction was conducted for 22 hours. At the end of chelation reaction, 16 g of water was slowly added to cause semi-coagulation (or partial coagulation). After decanting 447 g of the palladium-extracted liquid part, 300 g of acetone was added to wash the semi-coagulated polymer. The semi-coagulated polymer was completely dissolved in acetone with agitation. After completely dissolving the semi-coagulated polymer, 13 g of water was added to cause semi-coagulation. After decanting 330 g of the first polymer-washed liquid part, 300 g of acetone was added to wash the semi-coagulated polymer again. The semi-coagulated polymer was completely dissolved in acetone with agitation. After completely dissolving the semi-coagulated polymer, 13 g of water was added to make semi-coagulation again. After decanting 353 g of the second polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-1 polymer was 0 ppm. The results are shown in Table 4.

Example 19 was prepared according to the same procedure as Example 18 except different chelation time and washing conditions. The chelation was conducted for 15 hours. The first washing was conducted for 3 hours and the second washing was conducted for 2 hours and 6 g of water was used for the semi-coagulation. The residual palladium of the dried H-HNBR-1 polymer was 0 ppm. The results are shown in Table 4.

Example 20 was prepared according to the same procedure as Example 18 except different chelation time and washing conditions. The chelation was conducted for 10 hours. The first washing was conducted for 15 hours and the second washing was conducted for 2 hours and 13 g of water was used for the semi-coagulation. The residual palladium of the dried H-HNBR-1 polymer was 0 ppm. The results are shown in Table 4.

Example 21 was prepared according to the same procedure as Example 18 except different chelation time and washing conditions. The chelation was conducted for 6 hours. The first washing was conducted for 3 hours and the second washing was conducted for 15 hours and 13 g of water was used for the semi-coagulation. The residual palladium of the dried H-HNBR-1 polymer was 0 ppm. The results are shown in Table 4.

Example 22 was prepared according to the same procedure as Example 18 except different chelation time and washing conditions. The chelation was conducted for 15 hours. The first washing was conducted for 1 hours and the second washing was conducted for 3 hours and 10 g of water was used for the semi-coagulation. The residual palladium of the dried H-HNBR-1 polymer was 0 ppm. The results are shown in Table 4.

Example 23 was prepared according to the same procedure as Example 18 except different chelation time and washing conditions. The chelation was conducted for 6 hours. The first washing was conducted for 1 hours and the second washing was conducted for 1 hours and 10 g of water was used for the semi-coagulation. The residual palladium of the dried H-HNBR-1 polymer was 0 ppm. The results are shown in Table 4.

EXAMPLE 24-28

In Example 24 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-1 cement after recovering most of silica supported palladium, H-HNBR-1 cement was fully coagulated with an excess amount of water and dried. The dried H-HNBR-1 was shown to contain 176.7 ppm of residual palladium by using ICP method. 300 g of H-HNBR-1 cement having 176.7 ppm of residual palladium and 12.0% of solid by weight was placed in 1 liter of glass jar attached with an agitator. 300 g of acetone and 4.3 g of sodium diethyldithiocarbamate (SDEDTC) were mixed and added to the H-HNBR-1 cement. The total solid content was 6.0% by weight. After adding chelating agent (SDEDTC) solution, the chelation reaction was conducted for 6 hours. At the end of chelation reaction, 16 g of water was slowly added to cause semi-coagulation (or partial coagulation). After decanting 448 g of palladium-extracted liquid part, 300 g of acetone was added to wash the semi-coagulated polymer. The semi-coagulated polymer was completely dissolved in acetone with agitation. After completely dissolving the semi-coagulated polymer, 13 g of water was added to make semi-coagulation. After decanting 322 g of the first polymer-washed liquid part, 300 g of acetone was added to wash the semi-coagulated polymer again. The semi-coagulated polymer was completely dissolved in acetone with agitation. After completely dissolving the semi-coagulated polymer, 13 g of water was added to make semi-coagulation again. After decanting 321 g of the second polymer-washed liquid, the semi-coagulated polymer was added to the excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-1 polymer was 0 ppm. The results are shown in Table 5.

Example 25 was prepared according to the same procedure as Example 24 except different chelating agent (SDEDTC) amount and water amount for semi-coagulation for each step. Chelating agent (SDEDTC) was added 2.0 g instead of 4.3 g. Water for the semi-coagulation after chelation was added 18 g instead of 16 g. Water for the semi-coagulation after the first washing was added 15 g instead of 13 g. Water for the semi-coagulation after the second washing was added 15 g instead of 10 g. The residual palladium of the dried H-HNBR-1 polymer was 20.5 ppm. The results are shown in Table 6.

Example 26 was prepared according to the same procedure as Example 24 except different chelating agent (SDEDTC) amount and water amount for semi-coagulation for each step. Chelating agent (SDEDTC) was added 1.0 g instead of 4.3 g. Water for the semi-coagulation after chelation was added 18 g instead of 16 g. Water for the semi-coagulation after the first washing was added 15 g instead of 13 g. Water for the semi-coagulation after the second washing was added 10 g. The residual palladium of the dried H-HNBR-1 polymer was 18.0 ppm. The results are shown in Table 5.

Example 27 was prepared according to the same procedure as Example 24 except different chelating agent (SDEDTC) amount, different solid content for washing steps, and water amount for semi-coagulation for each step. Chelating agent (SDEDTC) was added 2.0 g instead of 4.3 g. Water for the semi-coagulation after chelation was added 18 g instead of 16 g. After decanting 459 g of Pd-extracted liquid, 450 g of acetone was added to the semi-coagulated polymer to make 6.4% of TSC (total solid content). After completely dissolving the semi-coagulated polymer in acetone, 15 g of water was added to make the semi-coagulation. After decanting 470 g of the first polymer-washed liquid, 450 g of acetone was added to the semi-coagulated polymer to make 6.5% of TSC (total solid content). Water for the semi-coagulation after the second washing was added 15 g instead of 10 g. The residual palladium of the dried H-HNBR-1 polymer was 0 ppm. The results are shown in Table 5.

Example 28 was prepared according to the same procedure as Example 24 except different chelating agent (SDEDTC) amount, different solid content for washing steps, and water amount for semi-coagulation for each step. Chelating agent (SDEDTC) was added 1.0 g instead of 4.3 g. Water for the semi-coagulation after chelation was added 18 g instead of 16 g. After decanting 447 g of Pd-extracted liquid, 450 g of acetone was added to the semi-coagulated polymer to make 6.3% of TSC (total solid content). After completely dissolving the semi-coagulated polymer in acetone, 15 g of water was added to cause the semi-coagulation. After decanting 488 g of the first polymer-washed liquid, 450 g of acetone was added to the semi-coagulated polymer to make 6.5% of TSC (total solid content). Water for the semi-coagulation after the second washing was added 15 g instead of 10 g. The residual palladium of the dried H-HNBR-1 polymer was 0 ppm. The results are shown in Table 5.

EXAMPLE 29-34

In Example 29 a highly hydrogenated acrylonitrile-butadiene rubber solution (the intermediate HNBR product which was provided from Zeon Chemicals LP: H-HNBR-2 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-2 cement after recovering most of the silica supported palladium, H-HNBR-2 cement was fully coagulated with an excess amount of water and dried. The dried H-HNBR-2 was shown to contain 175 ppm of residual palladium by using ICP method. 150 g of H-HNBR-2 cement having 175 ppm of residual palladium and 13.1% of solid by weight was placed in 1 liter of glass jar attached with an agitator. 3 g of water and 1.5 g of sodium diethyldithiocarbamate (SDEDTC) were mixed and added to the H-HNBR-2 cement. The total solid content was 12.7% by weight. After adding chelating agent (SDEDTC) solution, the chelation reaction was conducted for 5 hours. At the end of chelation reaction, an excess amount of water was added to cause a complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 102.8 ppm. The results are shown in Table 6.

In Example 30 a highly hydrogenated acrylonitrile-butadiene rubber solution (the intermediate HNBR product which was provided from Zeon Chemicals LP: H-HNBR-2 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-2 cement after recovering most of the silica supported palladium, H-HNBR-2 cement was fully coagulated with an excess amount of water and dried. The dried H-HNBR-2 was shown to contain 175 ppm of residual palladium by using ICP method. 150 g of H-HNBR-2 cement having 175 ppm of residual palladium and 13.1% of solid by weight was placed in 1 liter of glass jar attached with an agitator. 1.5 g of water and 1.5 g of sodium diethyldithiocarbamate (SDEDTC) were mixed and added to the H-HNBR-2 cement. The total solid content was 12.8% by weight. After adding chelating agent (SDEDTC) solution, the chelation reaction was conducted for 5 hours. At the end of chelation reaction, a water/acetone mixture having 3.5 g of water and 3.5 g of acetone was slowly added to make semi-coagulation (or partial coagulation). After decanting 70 g of palladium-extracted liquid part, 70 g of acetone was added to wash the semi-coagulated polymer with 12.3% of solid content by weight. The semi-coagulated polymer was completely dissolved in acetone with agitation. After completely dissolving the semi-coagulated polymer, a water/acetone mixture having 3.5 g of water and 3.5 g of acetone was added to cause semi-coagulation. After decanting 69 g of the first polymer-washed liquid part, an excess amount of water was added to the semi-coagulated polymer for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 49.2 ppm. The results are shown in Table 6.

Example 31 was prepared according to the same procedure as Example 30 except different TSC (total solid content) for Pd extraction and the first washing, water amount for chelating agent solution and water amount for semi-coagulation for each step. A mixture of 42 g of acetone, 3 g of water, and 1.5 g of Aquamet E (SDEDTC aqueous solution having 25% of SDEDTC by weight) was added to 150 g of H-HNBR-2 cement for the chelation under 10.0% of TSC. After chelating for 5 hours, a water/acetone mixture having 2.5 g of water and 2.5 g of acetone was slowly added to the chelated solution to cause semi-coagulation. After decanting 97 g of palladium-extracted liquid part, 97 g of acetone was added to wash the semi-coagulated polymer with 9.8% of solid content by weight. The semi-coagulated polymer was completely dissolved in acetone with agitation. After completely dissolving the semi-coagulated polymer, a water/acetone mixture having 3.0 g of water and 3.0 g of acetone was added to make semi-coagulation. After decanting 106 g of the first polymer-washed liquid part, an excess amount of water was added to the semi-coagulated polymer for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 35.3 ppm. The results are shown in Table 6.

Example 32 was prepared according to the same procedure as Example 30 except different TSC (total solid content) for Pd extraction and the first washing, water amount for chelating agent solution and water amount for semi-coagulation for each step. A mixture of 90 g of acetone, 3 g of water, and 1.5 g of Aquamet E (SDEDTC aqueous solution having 25% of SDEDTC by weight) was added to 150 g of H-HNBR-2 cement for the chelation under 8.0% of TSC. After chelating for 5 hours, a water/acetone mixture having 5.0 g of water and 5.0 g of acetone was slowly added to the chelated solution to cause semi-coagulation. After decanting 154 g of palladium-extracted liquid part, 154 g of acetone was added to wash the semi-coagulated polymer with 7.7% of solid content by weight. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 182 g of the first polymer-washed liquid part, an excess amount of water was added to the semi-coagulated polymer for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 28.5 ppm. The results are shown in Table 6.

Example 33 was prepared according to the same procedure as Example 30 except different TSC (total solid content) for Pd extraction and the first washing, water amount for chelating agent solution and water amount for semi-coagulation for each step. A mixture of 170 g of acetone, 3 g of water, and 1.5 g of Aquamet E (SDEDTC aqueous solution having 25% of SDEDTC by weight) was added to 150 g of H-HNBR-2 cement for the chelation under 6.1% of TSC. After chelating for 5 hours, a water/acetone mixture having 5.0 g of water and 5.0 g of acetone was slowly added to the chelated solution to cause semi-coagulation. After decanting 234 g of palladium-extracted liquid part, 234 g of acetone was added to wash the semi-coagulated polymer with 5.9% of solid content by weight. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 262 g of the first polymer-washed liquid part, an excess amount of water was added to the semi-coagulated polymer for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 22.9 ppm. The results are shown in Table 6.

Example 34 was prepared according to the same procedure as Example 30 except different TSC (total solid content) for Pd extraction and the first washing, water amount for chelating agent solution and water amount for semi-coagulation for each step. A mixture of 90 g of acetone, 3 g of water, and 1.5 g of Aquamet E (SDEDTC aqueous solution having 25% of SDEDTC by weight) was added to 150 g of H-HNBR-2 cement for the chelation under 8.0% of TSC. After chelating for 5 hours, a water/acetone mixture having 3.0 g of water and 3.0 g of acetone was slowly added to the chelated solution to cause semi-coagulation. After decanting 156 g of palladium-extracted liquid part, 234 g of acetone was added to wash the semi-coagulated polymer with 5.9% of solid content by weight. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 256 g of the first polymer-washed liquid part, an excess amount of water was added to the semi-coagulated polymer for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 19.5 ppm. The results are shown in Table 6.

EXAMPLE 35-38

In Example 35 a highly hydrogenated acrylonitrile-butadiene rubber solution (the intermediate HNBR product which was provided from Zeon Chemicals LP: H-HNBR-3 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-3 cement after recovering most of the silica supported palladium, H-HNBR-3 cement was fully coagulated with an excess amount of water and dried. The dried H-HNBR-3 was shown 182 ppm of residual palladium by using ICP method. 150 g of H-HNBR-3 cement having 182 ppm of residual palladium and 13.2% of solid by weight was placed in 1 liter of glass jar attached with an agitator. A water/acetone mixture having 4.5 g of water and 4.5 g of acetone was slowly added to H-HNBR-3 cement to extract impurities such as soap and metal oxides by using semi-coagulation. After decanting 63 g of impurity extraction liquid, 243 g of acetone was added to the semi-coagulated polymer. After dissolving polymer in acetone, 3 g of acetone and 0.25 g of Aquamet E (SDEDTC aqueous solution having 25% of SDEDTC by weight) were mixed and added to a H-HNBR-3 cement. The total solid content was 5.8% by weight. After adding chelating agent (SDEDTC) solution, the chelation reaction was conducted for 4 hours. At the end of chelation reaction, a water/acetone mixture having 5 g of water and 5 g of acetone was slowly added to cause semi-coagulation (or partial coagulation). After decanting 250 g of palladium-extracted liquid part, 250 g of acetone was added to wash the semi-coagulated polymer. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 295 g of the first polymer-washed liquid part, 295 g of acetone was added to wash the semi-coagulated polymer again. The semi-coagulated polymer was completely dissolved in acetone with agitation. After completely dissolving the semi-coagulated polymer, a water/acetone mixture having 7.5 g of water and 7.5 g of acetone was added to cause semi-coagulation again. After decanting 302 g of the second polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-3 polymer was 9.4 ppm. The results are shown in Table 7.

Example 36 was prepared according to the same procedure as Example 35 except different chelating agent amount, acetone amount with chelating agent and water/acetone amount for semi-coagulation after chelation step. Aquamet E and acetone for chelation were used 0.50 g and 6 g instead of 0.25 g and 3 g. For semi-coagulation after chelation step a water/acetone mixture was used 4.5 g of water and 4.5 g of acetone instead of 5.0 g of water and 5.0 g of acetone. The residual palladium of the dried H-HNBR-3 polymer was 4.1 ppm. The results are shown in Table 7.

Example 37 was prepared according to the same procedure as Example 35 except different chelating agent amount, acetone amount with chelating agent and water/acetone amount for semi-coagulation after chelation step. Aquamet E and acetone for chelation were used 1.0 g and 13 g instead of 0.25 g and 3 g. For semi-coagulation after chelation step a water/acetone mixture was used 4.5 g of water and 4.5 g of acetone instead of 5.0 g of water and 5.0 g of acetone. The residual palladium of the dried H-HNBR-3 polymer was 0 ppm. The results are shown in Table 7.

Example 38 was prepared according to the same procedure as Example 35 except different chelating agent amount, acetone amount with chelating agent and water/acetone amount for semi-coagulation after chelation step. Aquamet E and acetone for chelation were used 1.50 g and 19 g instead of 0.25 g and 3 g. For semi-coagulation after chelation step a water/acetone mixture was used 4.5 g of water and 4.5 g of acetone instead of 5.0 g of water and 5.0 g of acetone. The residual palladium of the dried H-HNBR-3 polymer was 0 ppm. The results are shown in Table 7.

EXAMPLE 39-43

In Example 39 a highly hydrogenated acrylonitrile-butadiene rubber solution (the intermediate HNBR product which was provided from Zeon Chemicals LP: H-HNBR-3 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-3 cement after recovering most of the silica supported palladium, H-HNBR-3 cement was fully coagulated with an excess amount of water and dried. The dried H-HNBR-3 was shown to contain 182 ppm of residual palladium by using ICP method. 150 g of H-HNBR-3 cement having 182 ppm of residual palladium and 13.2% of solid by weight was placed in 1 liter of glass jar attached with an agitator. A water/acetone mixture having 4.5 g of water and 4.5 g of acetone was slowly added to H-HNBR-3 cement to extract impurities such as soap and metal oxides by using semi-coagulation. After decanting 58 g of impurity-extracted liquid, 242 g of acetone was added to the semi-coagulated polymer. After dissolving polymer in acetone, 25 g of acetone and 2.0 g of Aquamet E (SDEDTC aqueous solution having 25% of SDEDTC by weight) were mixed and added to a H-HNBR-3 cement. The total solid content was 5.4% by weight. After adding chelating agent (SD-EDTC) solution, the chelation reaction was conducted for 1 hours. At the end of chelation reaction, a water/acetone mixture having 4.5 g of water and 4.5 g of acetone was slowly added to cause semi-coagulation (or partial coagulation). After decanting 276 g of palladium-extracted liquid part, 276 g of acetone was added to wash the semi-coagulated polymer. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 303 g of the first polymer-washed liquid part, 303 g of acetone was added to wash the semi-coagulated polymer again. The semi-coagulated polymer was completely dissolved in acetone with agitation. After completely dissolving the semi-coagulated polymer, a water/acetone mixture having 7.5 g of water and 7.5 g of acetone was added to cause semi-coagulation again. After decanting 308 g of the second polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-3 polymer was 2.1 ppm. The results are shown in Table 8.

Example 40 was prepared according to the same procedure as Example 39 except different chelation time. Chelation was conducted for 2 hours instead of 1 hour. The residual palladium of the dried H-HNBR-3 polymer was 0 ppm. The results are shown in Table 8.

Example 41 was prepared according to the same procedure as Example 39 except different chelation time. Chelation was conducted for 3 hours instead of 1 hour. The residual palladium of the dried H-HNBR-3 polymer was 0 ppm. The results are shown in Table 8.

Example 42 was prepared according to the same procedure as Example 39 except different chelation time. Chelation was conducted for 4 hours instead of 1 hour. The residual palladium of the dried H-HNBR-3 polymer was 0 ppm. The results are shown in Table 8.

Example 43 was prepared according to the same procedure as Example 39 except different chelating agent amount and different chelation time. Chelating agent (Aquamet E) was used 1.0 g instead of 2.0 g. Chelation was conducted for 3 hours instead of 1 hour. The residual palladium of the dried H-HNBR-3 polymer was 5.5 ppm. The results are shown in Table 8.

EXAMPLE 44

In Example 44 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-3 cement after recovering most of the silica supported palladium, H-HNBR-3 cement was fully coagulated with an excess amount of water and dried. The dried H-HNBR-3 was shown 182 ppm of residual palladium by using ICP method. 150 g of H-HNBR-3 cement having 182 ppm of residual palladium and 13.2% of solid by weight was placed in 1 liter of glass jar attached with an agitator. Without soap extraction step, 250 g of acetone was added to the H-HNBR-3 cement. After dissolving polymer in acetone, 13 g of acetone and 1.0 g of Aquamet E (SDEDTC aqueous solution having 25% of SDEDTC by weight) were mixed and added to a polymer solution. The total solid content was 4.8% by weight. After adding chelating agent (SDEDTC) solution, the chelation reaction was conducted for 4 hours. At the end of chelation reaction, a water/acetone mixture having 9.0 g of water and 9.0 g of acetone was slowly added to make semi-coagulation (or partial coagulation). After decanting 336 g of palladium-extracted liquid part, 270 g of acetone was added to wash the semi-coagulated polymer. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 300 g of the first polymer-washed liquid part, 300 g of acetone was added to wash the semi-coagulated polymer again. The semi-coagulated polymer was completely dissolved in acetone with agitation. After completely dissolving the semi-coagulated polymer, a water/acetone mixture having 7.5 g of water and 7.5 g of acetone was added to make semi-coagulation again. After decanting 310 g of the second polymer-washed liquid, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-3 polymer was 0 ppm. The results are shown in Table 9.

EXAMPLE 45-49

In Example 45 a highly hydrogenated acrylonitrile-butadiene rubber solution (the intermediate HNBR product which was provided from Zeon Chemicals LP: H-HNBR-1 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-3 cement after recovering most of the silica supported palladium, H-HNBR-3 cement was fully coagulated with an excess amount of water and dried. The dried H-HNBR-3 was shown to contain 182 ppm of residual palladium by using ICP method. 150 g of H-HNBR-3 cement having 182 ppm of residual palladium and 13.2% of solid by weight was placed in 1 liter of glass jar attached with an agitator. A water/acetone mixture having 4.5 g of water and 4.5 g of acetone was slowly added to H-HNBR-3 cement to extract impurities such as soap and metal oxides by using semi-coagulation. After decanting 60 g of impurity-extracted liquid, 545 g of acetone was added to the semi-coagulated polymer. After dissolving polymer in acetone, 25 g of acetone and 2.0 g of Aquamet E (SDEDTC aqueous solution having 25% of SDEDTC by weight) were mixed and added to a polymer solution. The total solid content was 3.0% by weight. After adding chelating agent (SDEDTC) solution, the chelation reaction was conducted for 5 hours. At the end of chelation reaction, a water/acetone mixture having 9.5 g of water and 9.5 g of acetone was slowly added to cause semi-coagulation (or partial coagulation). After decanting 623 g of palladium-extracted liquid part, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-3 polymer was 14.4 ppm. The results are shown in Table 10.

Example 46 was prepared according to the same procedure as Example 45 except different solid content for chelation step and different water amount for semi-coagulation. Acetone for chelation was added 370 g instead of 545 g to make 4.0% of TSC. After 5 hours of chelation reaction, a water/acetone mixture having 7.0 g of water and 7.0 g of acetone was slowly added to cause semi-coagulation. The residual palladium of the dried H-HNBR-3 polymer was 16.3 ppm. The results are shown in Table 10.

Example 47 was prepared according to the same procedure as Example 45 except different solid content for chelation step and different water amount for semi-coagulation. Acetone for chelation was added 225 g instead of 545 g to make 5.7% of TSC. After 5 hours of chelation reaction, a water/acetone mixture having 4.5 g of water and 4.5 g of acetone was slowly added to cause semi-coagulation. The residual palladium of the dried H-HNBR-3 polymer was 23.1 ppm. The results are shown in Table 10.

Example 48 was prepared according to the same procedure as Example 45 except different solid content for chelation step, different chelating agent amount, and different water amount for semi-coagulation. Acetone for chelation was added 555 g instead of 545 g to make 3.0% of TSC. Chelating agent (Aquamet E) was added 1.0 g instead of 2.0 g. After 5 hours of chelation reaction, a water/acetone mixture having 9.0 g of water and 9.0 g of acetone was slowly added to cause semi-coagulation. The residual palladium of the dried H-HNBR-3 polymer was 13.2 ppm. The results are shown in Table 10.

Example 49 was prepared according to the same procedure as Example 45 except different solid content for chelation step, different chelating agent amount, and different water amount for semi-coagulation. Acetone for chelation was added 389 g instead of 545 g to make 4.0% of TSC. Chelating agent (Aquamet E) was added 1.0 g instead of 2.0 g. After 5 hours of chelation reaction, a water/acetone mixture having 7.0 g of water and 7.0 g of acetone was slowly added to cause semi-coagulation. The residual palladium of the dried H-HNBR-3 polymer was 20.8 ppm. The results are shown in Table 10.

EXAMPLE 50-54

In Example 50 a highly hydrogenated acrylonitrile-butadiene rubber solution (the intermediate HNBR product which was provided from Zeon Chemicals LP: H-HNBR-2 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-2 cement after recovering most of the silica supported palladium, H-HNBR-2 cement was fully coagulated with excess amount of water and dried. The dried H-HNBR-2 was shown to contain 175 ppm of residual palladium by using ICP method. 150 g of H-HNBR-2 cement having 175 ppm of residual palladium and 13.1% of solid by weight was placed in 1 liter of glass jar attached with an agitator. Without soap extraction step, 170 g of acetone was added to the H-HNBR-2 cement. After dissolving polymer in acetone, 3 g of water, 13 g of acetone, and 1.5 g of Aquamet E (SDEDTC aqueous solution having 25% of SDEDTC by weight) were mixed and added to a polymer solution. The total solid content was 5.8% by weight. After adding chelating agent (SDEDTC) solution, the chelation reaction was conducted for 5 hours. At the end of chelation reaction, a water/acetone mixture having 5.0 g of water and 5.0 g of acetone was slowly added to cause semi-coagulation (or partial coagulation). After decanting 243 g of palladium-extracted liquid part, 243 g of acetone was added to wash the semi-coagulated polymer. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 274 g of the first polymer-washed liquid part, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 34.1 ppm. The results are shown in Table 11.

Example 51 was prepared according to the same procedure as Example 50 except acetone for the mixture with chelating agent (Aquamet E). Only 5 g of water and 1.5 g of Aquamet E was mixed and added to polymer solution. The residual palladium of the dried H-HNBR-2 polymer was 22.9 ppm. The results are shown in Table 11.

Example 52 was prepared according to the same procedure as Example 50 except acetone for the mixture with chelating agent (Aquamet E) and a water/acetone mixture amount for semi-coagulation. Only 3 g of water and 1.5 g of Aquamet E was mixed and added to polymer solution. A water/acetone mixture having 4.0 g of water and 4.0 g of acetone was slowly added to a chelated polymer solution to cause semi-coagulation. A water/acetone mixture having 6.0 g of water and 6.0 g of acetone was slowly added to the first washed polymer solution to cause semi-coagulation. The residual palladium of the dried H-HNBR-2 polymer was 28.4 ppm. The results are shown in Table 11.

Example 53 was prepared according to the same procedure as Example 50 except different solid content for chelation step, different water amount for the mixture with chelating agent (Aquamet E), a water/acetone mixture amount for semi-coagulation, and no the first washing step. 400 g of acetone was added to 150 g of H-HNBR-2 cement to make 3.4% of solid content. 7 g of water, 13 g of acetone, and 1.5 g of Aquamet E was mixed and added to polymer solution. After chelating for 5 hours, a water/acetone mixture having 7.0 g of water and 7.0 g of acetone was slowly added to a chelated polymer solution to cause semi-coagulation. There was no the first washing step. The residual palladium of the dried H-HNBR-2 polymer was 51.1 ppm. The results are shown in Table 11.

Example 54 was repeated Example 53. The residual palladium of the dried H-HNBR-2 polymer was 49.7 ppm. The results are shown in Table 11.

EXAMPLE 55

In Example 55 a partially hydrogenated acrylonitrile-butadiene rubber solution (the intermediate HNBR product which was provided from Zeon Chemicals LP: P-HNBR-2 cement) was made with heterogeneous catalyst (silica-supported palladium) in acetone. After finishing the hydrogenation with heterogeneous catalyst under hydrogen at high pressure, most of palladium was recovered in the silica supported state. After fully coagulation with excess amount of water and drying, 53.5 ppm of residual palladium was existed in the partially hydrogenated acrylonitrile-butadiene rubber. 100 g of P-HNBR-2 cement having 53.5 ppm of residual palladium and 15.1% of solid by weight was placed in 1 liter of glass jar attached with an agitator. 220 g of acetone was added to the P-HNBR-2 cement. After dissolving polymer in acetone, 5 g of water and 1.0 g of Aquamet E (SDEDTC aqueous solution having 25% of SDEDTC by weight) were mixed and added to a polymer solution. The total solid content was 6% by weight. After adding chelating agent (SDEDTC) solution, the chelation reaction was conducted for 5 hours. At the end of chelation reaction, a water/acetone mixture having 4.0 g of water and 4.0 g of acetone was slowly added to cause semi-coagulation (or partial coagulation). After decanting 277 g of palladium-extracted liquid part, 277 g of acetone was added to wash the semi-coagulated polymer. The semi-coagulated polymer was completely dissolved in acetone with agitation. After completely dissolving the semi-coagulated polymer, a water/acetone mixture having 7.5 g of water and 7.5 g of acetone was added to cause semi-coagulation. After decanting 315 g of the first polymer-washed liquid part, the semi-coagulated polymer was added to an excess amount of water for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried P-HNBR-2 polymer was 13.2 ppm. The results are shown in Table 12.

EXAMPLE 56-62

In Example 56 a highly hydrogenated acrylonitrile-butadiene rubber solution (the intermediate HNBR product which was provided from Zeon Chemicals LP: H-HNBR-2 cement) was made with heterogeneous catalyst (silica-supported palladium) in acetone. After finishing the hydrogenation with heterogeneous catalyst under hydrogen at high pressure, most of palladium was recovered in the silica supported state. To measure residual palladium in H-HNBR-2 cement after recovering most of the silica supported palladium, H-HNBR-2 cement was fully coagulated with an excess amount of water and dried. The dried H-HNBR-2 was shown to contain 175 ppm of residual palladium by using ICP method. 150 g of H-HNBR-2 cement having 175 ppm of residual palladium and 13.1% of solid by weight was placed in 1 liter of glass jar attached with an agitator. Without soap extraction step, 170 g of acetone was added to the H-HNBR-2 cement. After dissolving polymer in acetone, 5 g of water and 1.5 g of Aquamet E (SDEDTC aqueous solution having 25% of SDEDTC by weight) were mixed and added to a polymer solution. The total solid content was 6.0% by weight. After adding chelating agent (SDEDTC) solution, the chelation reaction was conducted for 5 hours. At the end of chelation reaction, 500 g of water was added for the complete coagulation. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 80.2 ppm. The results are shown in Table 13.

Example 57 was prepared according to the same procedure as Example 56 except semi-coagulation and washing step. After chelation for 5 hours, a water/acetone mixture having 9.8 g of water and 186 g of acetone was added to the chelated polymer solution for the semi-coagulation and washing step simultaneously. After semi-coagulation/washing simultaneously, 430 g of palladium-extracted liquid was decanted. After decanting palladium-extracted liquid, excess amount of water was added to the semi-coagulated polymer to make a fully coagulated HNBR polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 38.6 ppm. The results are shown in Table 13.

Example 58 was prepared according to the same procedure as Example 56 except semi-coagulation and washing step. After chelation for 5 hours, a water/acetone mixture having 13.1 g of water and 248 g of acetone was added to the chelated polymer solution for the semi-coagulation and washing step simultaneously. After semi-coagulation/washing simultaneously, 490 g of palladium-extracted liquid was decanted. After decanting palladium-extracted liquid, an excess amount of water was added to the semi-coagulated polymer to make a fully coagulated H-HNBR-2 polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 32.7 ppm. The results are shown in Table 13.

Example 59 was prepared according to the same procedure as Example 56 except semi-coagulation and washing step. After chelation for 5 hours, a water/acetone mixture having 13.4 g of water and 313 g of acetone was added to the chelated polymer solution for the semi-coagulation and washing step simultaneously. After semi-coagulation/washing simultaneously, 554 g of palladium-extracted liquid was decanted. After decanting palladium-extracted liquid, an excess amount of water was added to the semi-coagulated polymer to make a fully coagulated H-HNBR-2polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 30.0 ppm. The results are shown in Table 13.

Example 60 was prepared according to the same procedure as Example 56 except semi-coagulation and washing step. After chelation for 5 hours, a water/acetone mixture having 11.8 g of water and 380 g of acetone was added to the chelated polymer solution for the semi-coagulation and washing step simultaneously. After semi-coagulation/washing simultaneously, 620 g of palladium-extracted liquid was decanted. After decanting palladium-extracted liquid, an excess amount of water was added to the semi-coagulated polymer to make a fully coagulated HNBR polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 was 28.9 ppm. The results are shown in Table 13.

Example 61 was prepared according to the same procedure as Example 56 except semi-coagulation and washing step. After chelation for 5 hours, a water/acetone mixture having 16.1 g of water and 376 g of acetone was added to the chelated polymer solution for the semi-coagulation and washing step simultaneously. After semi-coagulation/washing simultaneously, 617 g of palladium-extracted liquid was decanted. After decanting palladium-extracted liquid, an excess amount of water was added to the semi-coagulated polymer to make a fully coagulated H-HNBR-2 polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 28.6 ppm. The results are shown in Table 13.

Example 62 was prepared according to the same procedure as Example 56 except semi-coagulation and washing step. After chelation for 5 hours, a water/acetone mixture having 19.6 g of water and 372 g of acetone was added to the chelated polymer solution for the semi-coagulation and washing step simultaneously. After semi-coagulation/washing simultaneously, 616 g of palladium-extracted liquid was decanted. After decanting palladium-extracted liquid, an excess amount of water was added to the semi-coagulated polymer to make a fully coagulated HNBR polymer. After filtering and drying the completely coagulated polymer, the dried polymer was obtained. The dried polymer was analyzed for residual palladium using ICP (Inductively Coupled Plasma Argon Emission Spectroscopy). The residual palladium of the dried H-HNBR-2 polymer was 33.0 ppm. The results are shown in Table 13.

TABLE 1

Examples of high saturated HNBR cement with PEX

| | Example No. | | | | | | |
|---|---|---|---|---|---|---|---|
| | 1 | 2 | 3 | 4 | 5 | 6 | 7 |
| $^a$H-HNBR-1 cement (g) | 100 | 100 | 100 | 100 | 100 | 100 | 100 |
| Chelating agent | $^b$PEX | PEX | PEX | PEX | PEX | PEX | PEX |
| Chelating agent (g) | 1.2 | 1.8 | 1.2 | 1.2 | 1.8 | 1.8 | 1.4 |
| $^c$Acetone (g) | 11 | 10 | 100 | 96 | 96 | 200 | 96 |
| water (g) | 1.2 | 1.2 | 1.8 | 1.5 | 1.5 | 1.5 | 1.5 |
| $^d$TSC (%) | 10.6 | 10.6 | 5.9 | 6.0 | 6.0 | 4.0 | 6.0 |
| Reaction time (hr) | 15 | 15 | 15 | 15 | 15 | 17 | 15 |
| Water (g) for semi-coagulation | 5.9 | 5.9 | 5.9 | 5.9 | 5.9 | 9.4 | 7.1 |
| Washing with acetone (g) | No | No | No | No | No | No | 90 |
| Residual Pd in H-HNBR-1 (ppm) | 67.3 | 62.1 | 53.9 | 35.3 | 33.4 | 30.3 | 0 |
| Recovered Pd (%) | 61.9 | 64.9 | 69.5 | 80.0 | 81.1 | 82.9 | 100.0 |
| Mixing method | shaking | shaking | shaking | Agitation | Agitation | Agitation | Agitation |
| Washing step | no | no | no | no | no | no | washing |

$^a$H-HNBR-1 cement: Highly hydrogenated nitrile rubber - acetone solution having 12.0% of solid content, 99% of hydrogenation, and 176.7 ppm of residual Pd which was provided from Zeon Chemicals LP
$^b$PEX: Potassium ethyl xanthate (Aldrich)
$^c$ACETONE: No purified acetone (Fisher Scientific)
$^d$TSC (%): Total solid content during chelation step

TABLE 2

Examples of high saturated HNBR cement with SDEDTC

| | Example No. | | | | | | | |
|---|---|---|---|---|---|---|---|---|
| | 8 | 9 | 10 | 11 | 12 | 13 | 14 | 15 |
| H-HNBR-1 (g) | 100 | 100 | 100 | 100 | 100 | 100 | 100 | 100 |
| Chelating agent | $^e$SDEDTC | SDEDTC | SDEDTC | SDEDTC | SDEDTC | SDEDTC | SDEDTC | SDEDTC |
| Chelating agent (g) | 1.2 | 1.8 | 1.2 | 1.2 | 1.8 | 1.8 | 1.4 | 1.4 |
| Acetone (g) | 17 | 21 | 100 | 96 | 96 | 235 | 96 | 96 |
| water (g) | 0.0 | 0.0 | 0.6 | 0.0 | 0.0 | 0.0 | 0.0 | 0.0 |
| TSC (%) | 10.1 | 9.7 | 5.9 | 6.1 | 6.1 | 3.6 | 6.1 | 6.1 |
| Reaction time (hr) | 15 | 15 | 15 | 15 | 15 | 17 | 15 | 15 |
| Water (g) for semi-coagulation | 5.9 | 5.9 | 5.9 | 5.9 | 5.9 | 9.4 | 7.1 | 5.3 |
| Washing with acetone (g) | No | No | No | No | No | No | 90 | 180 |
| Residual Pd in H-HNBR-1 (ppm) | 83.6 | 86.4 | 65.4 | 55.4 | 56.1 | 40.9 | 33.7 | 0 |
| Recovered Pd (%) | 52.7 | 51.1 | 63.0 | 68.6 | 68.3 | 76.9 | 80.9 | 100.0 |
| Mixing method | shaking | shaking | shaking | agitation | agitation | agitation | agitation | agitation |
| Washing step | no | no | no | no | no | no | washing | 2 washing |

$^e$SDEDTC: Sodium diethyldithiocarbamate (Aldrich)

TABLE 3

Examples of low saturated HNBR cement

| | Example No. | |
|---|---|---|
| | 16 | 17 |
| $^f$P-HNBR-1 (g) | 100 | 100 |
| Chelating agent | PEX | SDEDTC |
| Chelating agent (g) | 0.6 | 0.6 |
| Acetone (g) | 129 | 129 |
| water (g) | 1.0 | 0.0 |
| TSC (%) | 6.0 | 6.0 |

TABLE 3-continued

Examples of low saturated HNBR cement

| | Example No. 16 | Example No. 17 |
|---|---|---|
| Reaction time (hr) | 17 | 17 |
| Water (g) for semi-coagulation | 8 | 8 |
| Acetone for washing (g) | 106 | 106 |
| Residual Pd in P-HNBR-1 (ppm) | 0 | 0 |
| Recovered Pd (%) | 100.0 | 100.0 |
| Mixing method | Agitation | agitation |

[f]P-HNBR-1 cement: Highly hydrogenated nitrile rubber - acetone solution having 13.9% of solid content, 91% of hydrogenation, and 42.3 ppm of residual Pd which was provided from Zeon Chemicals LP

TABLE 6

Examples for TSC during chelation step and for semi-coagulation/washing effect

| | Example No. | | | | | |
|---|---|---|---|---|---|---|
| | 29 | 30 | 31 | 32 | 33 | 34 |
| [g]H-HNBR-2 (g) | 150 | 150 | 150 | 150 | 150 | 150 |
| Acetone for Pd extraction (g) | 0 | 0 | 42 | 90 | 170 | 90 |
| Water (g) | 3 | 1.5 | 3 | 3 | 3 | 3 |
| [h]Aquamet E (g) | 1.5 | 1.5 | 1.5 | 1.5 | 1.5 | 1.5 |
| TSC for Pd extraction (%) | 12.7 | 12.8 | 10.0 | 8.0 | 6.1 | 8.0 |
| Pd extraction time (hr) | 5.0 | 5.0 | 5.0 | 5.0 | 5.0 | 3.0 |
| Water for semi-coagulation (g) | 0.0 | 3.5 | 2.5 | 5.0 | 5.0 | 5.0 |

TABLE 4

Examples for chelation time in high saturated HNBR cement with SDEDTC

| | Example No. | | | | | |
|---|---|---|---|---|---|---|
| | 18 | 19 | 20 | 21 | 22 | 23 |
| H-HNBR-1 (g) | 300 | 300 | 300 | 300 | 300 | 300 |
| Chelating agent | SDEDTC | SDEDTC | SDEDTC | SDEDTC | SDEDTC | SDEDTC |
| Chelating agent (g) | 4.3 | 4.3 | 4.3 | 4.3 | 4.3 | 4.3 |
| Acetone (g) | 300 | 300 | 300 | 300 | 300 | 300 |
| TSC (%) | 6.0 | 6.0 | 6.0 | 6.0 | 6.0 | 6.0 |
| Extraction time (hr) | 22 | 15 | 10 | 6 | 15 | 6 |
| Water for semi-coagulation (g) | 16 | 16 | 16 | 16 | 16 | 16 |
| Pd-extracted liquid (g) | 447 | 450 | 468 | 461 | 469 | 448 |
| Acetone for 1st washing (g) | 300 | 300 | 300 | 300 | 300 | 300 |
| 1st washing time (hr) | 1.0 | 3.0 | 15.0 | 3.0 | 1.0 | 1.0 |
| Water for 1st semi-coagulation (g) | 13 | 13 | 13 | 13 | 13 | 13 |
| 1st polymer-washed liquid (g) | 330 | 330 | 334 | 344 | 328 | 322 |
| Acetone for 2nd washing (g) | 300 | 300 | 300 | 300 | 300 | 300 |
| 2nd washing time (hr) | 1.0 | 2.0 | 2.0 | 15.0 | 3.0 | 1.0 |
| Water for 2nd semi-coagulation (g) | 13 | 6 | 13 | 13 | 10 | 10 |
| Residual Pd in H-HNBR-1 (ppm) | 0 | 0 | 0 | 0 | 0 | 0 |
| Pd recovery (%) | 100 | 100 | 100 | 100 | 100 | 100 |

TABLE 5

Examples for chelating agent amount in high saturated HNBR cement with SDEDTC

| | Example No. | | | | |
|---|---|---|---|---|---|
| | 24 | 25 | 26 | 27 | 28 |
| H-HNBR-1 (g) | 300 | 300 | 300 | 300 | 300 |
| Chelating agent | SDEDTC | SDEDTC | SDEDTC | SDEDTC | SDEDTC |
| Chelating agent (g) | 4.3 | 2.0 | 1.0 | 2.0 | 1.0 |
| Acetone (g) | 300 | 300 | 300 | 300 | 300 |
| TSC (%) | 6.0 | 6.0 | 6.0 | 6.0 | 6.0 |
| Extraction time (hr) | 6 | 6 | 6 | 6 | 6 |
| Water for semi-coagulation (g) | 16 | 18 | 18 | 18 | 18 |
| Pd-extracted liquid (g) | 448 | 440 | 448 | 459 | 447 |
| Acetone for 1st washing (g) | 300 | 300 | 300 | 450 | 450 |
| 1st washing time (hr) | 1.0 | 1.0 | 1.0 | 1.5 | 1.5 |
| Water for 1st semi-coagulation (g) | 13 | 15 | 15 | 15 | 15 |
| 1st polymer-washed liquid (g) | 322 | 328 | 327 | 470 | 488 |
| Acetone for 2nd washing (g) | 300 | 300 | 300 | 450 | 450 |
| 2nd washing time (hr) | 1.0 | 1.0 | 1.0 | 1.5 | 1.5 |
| Water for 2nd semi-coagulation (g) | 10 | 15 | 10 | 15 | 15 |
| Residual Pd in H-HNBR-1 (ppm) | 0 | 20.5 | 18 | 0 | 0 |
| Pd recovery (%) | 100 | 88.4 | 89.8 | 100 | 100 |

TABLE 6-continued

Examples for TSC during chelation step and for semi-coagulation/washing effect

| | Example No. | | | | | |
|---|---|---|---|---|---|---|
| | 29 | 30 | 31 | 32 | 33 | 34 |
| Acetone for semi-coagulation (g) | 0.0 | 3.5 | 2.5 | 5.0 | 5.0 | 5.0 |
| Pd-extracted liquid (g) | | 70 | 97 | 154 | 234 | 156 |
| Acetone for 1st washing (g) | | 70 | 97 | 154 | 234 | 234 |
| 1st washing time (hr) | | 0.5 | 0.5 | 0.5 | 0.5 | 0.5 |
| Water for semi-coagulation (g) | | 3.5 | 3.0 | 7.5 | 7.5 | 7.5 |
| Acetone for semi-coagulation (g) | | 3.5 | 3.0 | 7.5 | 7.5 | 7.5 |
| Residual Pd in H-HNBR-2 (ppm) | 102.8 | 49.2 | 35.3 | 28.5 | 22.9 | 19.5 |
| Pd recovery (%) | 41.3 | 71.9 | 79.8 | 83.7 | 86.9 | 88.9 |

[g]H-HNBR-2 cement: Highly hydrogenated nitrile rubber - acetone solution having 13.1% of solid content, 99% of hydrogenation, and 175 ppm of residual Pd which was provided from Zeon Chemicals LP
[h]AQUAMET E: Sodium diethyldithiocarbamate having 25% of solid content by weight (Akzo Nobel Surface Chemistry LLC.)

TABLE 7

Examples of chelation time and chelating agent amount with soap extraction step

| | Example No. | | | |
|---|---|---|---|---|
| | 35 | 36 | 37 | 38 |
| [i]H-HNBR-3 (g) | 150 | 150 | 150 | 150 |
| Water for semi-coagulation (g) | 4.5 | 4.5 | 4.5 | 4.5 |
| Acetone for semi-coagulation (g) | 4.5 | 4.5 | 4.5 | 4.5 |
| Soap extraction liquid (g) | 63 | 62 | 67 | 61 |
| Acetone for Pd extraction (g) | 243 | 250 | 250 | 237 |
| Aquamet E (g) | 0.25 | 0.50 | 1.00 | 1.50 |
| Acetone for chelating agent solution (g) | 3 | 6 | 13 | 19 |
| TSC for Pd extraction (%) | 5.8 | 5.6 | 5.6 | 5.6 |
| Pd extraction time (hr) | 4.0 | 4.0 | 4.0 | 4.0 |
| Water for semi-coagulation (g) | 5.0 | 4.5 | 4.5 | 4.5 |
| Acetone for semi-coagulation (g) | 5.0 | 4.5 | 4.5 | 4.5 |
| Pd-extracted liquid (g) | 250 | 256 | 270 | 266 |
| Acetone for 1st washing (g) | 250 | 256 | 270 | 266 |
| 1st washing time (hr) | 1.0 | 1.0 | 1.0 | 1.0 |
| Water for semi-coagulation (g) | 7.5 | 7.5 | 7.5 | 7.5 |
| Acetone for semi-coagulation (g) | 7.5 | 7.5 | 7.5 | 7.5 |
| 1st polymer-washed liquid (g) | 295 | 297 | 308 | 295 |
| Acetone for 2nd washing (g) | 295 | 297 | 308 | 295 |
| 2nd washing time (hr) | 1.0 | 1.0 | 1.0 | 1.0 |
| Water for semi-coagulation (g) | 7.5 | 7.5 | 7.5 | 7.5 |
| Acetone for semi-coagulation (g) | 7.5 | 7.5 | 7.5 | 7.5 |
| Residual Pd in H-HNBR-3 (ppm) | 9.4 | 4.1 | 0 | 0 |
| Pd recovery (%) | 94.8 | 97.7 | 100.0 | 100.0 |

[i]H-HNBR-3 cement: Highly hydrogenated nitrile rubber - acetone solution having 13.1% of solid content, 99% of hydrogenation, and 182 ppm of residual Pd which was provided from Zeon Chemicals LP

TABLE 8

Examples for the effect of chelation time and chelating agent amount

| | Example No. | | | | | |
|---|---|---|---|---|---|---|
| | 39 | 40 | 41 | 42 | 43 | 37 |
| H-HNBR-3 (g) | 150 | 150 | 150 | 150 | 150 | 150 |
| Water for semi-coagulation (g) | 4.5 | 4.5 | 4.5 | 4.5 | 4.5 | 4.5 |
| Acetone for semi-coagulation (g) | 4.5 | 4.5 | 4.5 | 4.5 | 4.5 | 4.5 |
| Soap extraction liquid (g) | 58 | 64 | 60 | 62 | 60 | 67 |
| Acetone for chelation (g) | 242 | 240 | 236 | 238 | 250 | 250 |

TABLE 8-continued

Examples for the effect of chelation time and chelating agent amount

| | Example No. | | | | | |
|---|---|---|---|---|---|---|
| | 39 | 40 | 41 | 42 | 43 | 37 |
| Aquamet E (g) | 2.0 | 2.0 | 2.0 | 2.0 | 1.0 | 1.0 |
| Acetone for chelation (g) | 25 | 25 | 25 | 25 | 12.5 | 13 |
| TSC for Pd extraction (%) | 5.4 | 5.5 | 5.5 | 5.5 | 5.5 | 5.6 |
| Chelation time (hr) | 1.0 | 2.0 | 3.0 | 4.0 | 3.0 | 4.0 |
| Water for semi-coagulation (g) | 4.5 | 4.5 | 4.5 | 4.5 | 4.5 | 4.5 |
| Acetone for semi-coagulation (g) | 4.5 | 4.5 | 4.5 | 4.5 | 4.5 | 4.5 |
| Pd-extracted liquid (g) | 276 | 280 | 276 | 266 | 275 | 270 |
| Acetone for 1st washing (g) | 276 | 280 | 276 | 266 | 275 | 270 |
| 1st washing time (hr) | 1.0 | 1.0 | 1.0 | 1.0 | 1.0 | 1.0 |
| Water for semi-coagulation (g) | 7.5 | 7.5 | 7.5 | 7.5 | 7.5 | 7.5 |
| Acetone for semi-coagulation (g) | 7.5 | 7.5 | 7.5 | 7.5 | 7.5 | 7.5 |
| 1st polymer-washed liquid (g) | 303 | 314 | 300 | 295 | 309 | 308 |
| Acetone for 2nd washing (g) | 303 | 314 | 300 | 295 | 309 | 308 |
| 2nd washing time (hr) | 1.0 | 1.0 | 1.0 | 1.0 | 1.0 | 1.0 |
| Water for semi-coagulation (g) | 7.5 | 7.5 | 7.5 | 7.5 | 7.5 | 7.5 |
| Acetone for semi-coagulation (g) | 7.5 | 7.5 | 7.5 | 7.5 | 7.5 | 7.5 |
| Residual Pd in H-HNBR-3 (ppm) | 2.1 | 0 | 0 | 0 | 5.5 | 0 |
| Pd recovery (%) | 98.8 | 100.0 | 100.0 | 100.0 | 97.0 | 100.0 |

TABLE 9

Examples for the effect of soap extraction step

| | Example No. | |
|---|---|---|
| | 37 | 44 |
| H-HNBR-3 (g) | 150 | 150 |
| Water for semi-coagulation (g) | 4.5 | |
| Acetone for semi-coagulation (g) | 4.5 | |
| Soap extraction liquid (g) | 67 | |
| Acetone for Pd extraction (g) | 250 | 250 |
| Aquamet E (g) | 1.0 | 1.0 |
| Acetone for chelating agent solution (g) | 13 | 13 |
| TSC for Pd extraction (%) | 5.6 | 4.8 |
| Pd extraction time (hr) | 4.0 | 4.0 |
| Water for semi-coagulation (g) | 4.5 | 9.0 |
| Acetone for semi-coagulation (g) | 4.5 | 9.0 |
| Pd-extracted liquid (g) | 270 | 336 |
| Acetone for 1st washing (g) | 270 | 270 |
| 1st washing time (hr) | 1.0 | 1.0 |
| Water for semi-coagulation (g) | 7.5 | 7.5 |
| Acetone for semi-coagulation (g) | 7.5 | 7.5 |
| 1st polymer-washed liquid (g) | 308 | 300 |
| Acetone for 2nd washing (g) | 308 | 300 |
| 2nd washing time (hr) | 1.0 | 1.0 |
| Water for semi-coagulation (g) | 7.5 | 7.5 |
| Acetone for semi-coagulation (g) | 7.5 | 7.5 |
| Residual Pd in H-HNBR-3 (ppm) | 0 | 0 |
| Pd recovery (%) | 100.0 | 100.0 |

TABLE 10

Examples for the effect of 1st and 2nd washing steps

| | Example No. | | | | |
|---|---|---|---|---|---|
| | 45 | 46 | 47 | 48 | 49 |
| H-HNBR-3 (g) | 150 | 150 | 150 | 150 | 150 |
| Water for semi-coagulation (g) | 4.5 | 4.5 | 4.5 | 4.5 | 4.5 |
| Acetone for semi-coagulation (g) | 4.5 | 4.5 | 4.5 | 4.5 | 4.5 |

TABLE 10-continued

Examples for the effect of 1st and 2nd washing steps

| | Example No. | | | | |
|---|---|---|---|---|---|
| | 45 | 46 | 47 | 48 | 49 |
| Extraction time (hr) | 0.5 | 0.5 | 0.5 | 0.5 | 0.5 |
| Soap-extracted liquid (g) | 60 | 58 | 65 | 61 | 61 |
| Acetone for Pd extraction (g) | 545 | 370 | 225 | 555 | 389 |
| Aquamet E (g) | 2.0 | 2.0 | 2.0 | 1.0 | 1.0 |
| Acetone for chelating agent solution (g) | 25 | 25 | 25 | 12.5 | 12.5 |
| TSC for Pd extraction (%) | 3.0 | 4.0 | 5.7 | 3.0 | 4.0 |
| Pd extraction time (hr) | 5.0 | 5.0 | 5.0 | 5.0 | 5.0 |
| Water for semi-coagulation (g) | 9.5 | 7.0 | 4.5 | 9.0 | 7.0 |
| Acetone for semi-coagulation (g) | 9.5 | 7.0 | 4.5 | 9.0 | 7.0 |
| Residual Pd in H-HNBR-3 (ppm) | 14.4 | 16.3 | 23.1 | 13.2 | 20.8 |
| Pd recovery (%) | 92.1 | 91.0 | 87.3 | 92.7 | 88.6 |

TABLE 11

Examples for the effect of 1st and 2nd washing steps

| | Example No. | | | | | |
|---|---|---|---|---|---|---|
| | 44 | 50 | 51 | 52 | 53 | 54 |
| H-HNBR-3 (g) | 150 | | | | | |
| H-HNBR-2 (g) | | 150 | 150 | 150 | 150 | 150 |
| Water (g) | | 3 | 5 | 3 | 7 | 7 |
| Acetone for Pd extraction (g) | 250 | 170 | 170 | 170 | 400 | 400 |
| Aquamet E (g) | 1.0 | 1.5 | 1.5 | 1.5 | 1.5 | 1.5 |
| Acetone for chelating agent solution (g) | 13 | 13 | | | 13 | 13 |
| TSC for Pd extraction (%) | 4.8 | 5.8 | 6.1 | 6.1 | 3.4 | 3.4 |
| Pd extraction time (hr) | 4.0 | 5.0 | 5.0 | 5.0 | 5.0 | 5.0 |
| Water for semi-coagulation (g) | 9.0 | 5.0 | 5.0 | 4.0 | 7.0 | 7.0 |
| Acetone for semi-coagulation (g) | 9.0 | 5.0 | 5.0 | 4.0 | 7.0 | 7.0 |
| Pd-extracted liquid (g) | 336 | 243 | 234 | 234 | 498 | 491 |
| Acetone for 1st washing (g) | 270 | 243 | 234 | 234 | | |
| 1st washing time (hr) | 1.0 | 0.5 | 0.5 | 0.5 | | |
| Water for semi-coagulation (g) | 7.5 | 7.5 | 7.5 | 6.0 | | |
| Acetone for semi-coagulation (g) | 7.5 | 7.5 | 7.5 | 6.0 | | |
| 1st polymer-washed liquid (g) | 300 | 274 | 262 | 258 | | |
| Acetone for 2nd washing (g) | 300 | | | | | |
| 2nd washing time (hr) | 1.0 | | | | | |
| Water for semi-coagulation (g) | 7.5 | | | | | |
| Acetone for semi-coagulation (g) | 7.5 | | | | | |
| Residual Pd in HNBR (ppm) | 0 | 34.1 | 22.9 | 28.4 | 51.1 | 49.7 |
| Pd recovery (%) | 100 | 80.5 | 86.9 | 83.8 | 70.8 | 71.6 |

TABLE 12

Examples of low saturated HNBR cement

| | Example No. 55 |
|---|---|
| jP-HNBR-2 (g) | 150 |
| Acetone for Pd extraction (g) | 220 |
| Water (g) | 5 |
| Aquamet E (g) | 1.0 |
| TSC for Pd extraction (%) | 6.0 |
| Pd extraction time (hr) | 5.0 |
| Water for semi-coagulation (g) | 4.0 |
| Acetone for semi-coagulation (g) | 4.0 |
| Pd-extracted liquid (g) | 277 |
| Acetone for 1st washing (g) | 277 |
| 1st washing time (hr) | 0.5 |
| Water for semi-coagulation (g) | 7.5 |
| Acetone for semi-coagulation (g) | 7.5 |
| Residual Pd in P-HNBR-2 (ppm) | 13.2 |
| Pd recovery (%) | 76.7 | jP-HNBR-2 cement: Highly hydrogenated nitrile rubber - acetone solution having 15.1% of solid content, 91% of hydrogenation, and 53.5 ppm of residual Pd which was provided from Zeon Chemicals

TABLE 13

Examples of ratio of solvent and chelated cement for the semi-coagulation/washing step

| | Example No. | | | | | | |
|---|---|---|---|---|---|---|---|
| | 56 | 57 | 58 | 59 | 60 | 61 | 62 |
| Chelation step | | | | | | | |
| H-HNBR-2 (g) | 150 | 150 | 150 | 150 | 150 | 150 | 150 |
| Acetone for Pd extraction (g) | 170 | 170 | 170 | 170 | 170 | 170 | 170 |
| Water (g) | 5 | 5 | 5 | 5 | 5 | 5 | 5 |
| Aquamet E (g) | 1.5 | 1.5 | 1.5 | 1.5 | 1.5 | 1.5 | 1.5 |
| TSC for chelation step (%) | 6.0 | 6.0 | 6.0 | 6.0 | 6.0 | 6.0 | 6.0 |
| Chelation time (hr) | 5.0 | 5.0 | 5.0 | 5.0 | 5.0 | 5.0 | 5.0 |
| Semi-coagulation/washing step | | | | | | | |
| Water for semi-coagulation (g) | 500.0 | 9.8 | 13.1 | 13.4 | 11.8 | 16.1 | 19.6 |
| Acetone for washing (g) | 0 | 186 | 248 | 313 | 380 | 376 | 372 |
| Residual Pd in H-HNBR-2 (ppm) | 80.2 | 38.6 | 32.7 | 30.0 | 28.9 | 28.6 | 33.0 |
| Recovery of Pd (%) | 54.2 | 77.9 | 81.3 | 82.9 | 83.5 | 83.7 | 81.1 |

What is claimed is:

1. A process for recovering a metal catalyst from hydrogenated nitrile rubber solution comprising: a chelation step using a chelating agent selected from a xanthate, a diothiocarbamate, or a trithiocarbonate compound; an extraction step using semi-coagulation; and an optional washing step using an organic solvent.

2. The process of claim 1 wherein the metal catalyst is selected from a palladium, platinum, rhodium, or ruthenium catalyst.

3. The process of claim 1 wherein the hydrogenated nitrile rubber solution is composed of hydrogenated nitrile rubber, metal catalyst, and an organic solvent.

4. The process of claim 1 wherein the extraction step using semi-coagulation is obtained by a polar solvent to separate a metal catalyst-chelating agent complex from the hydrogenated nitrile rubber solution.

5. The process of claim 1 wherein the hydrogenated nitrile rubber contained in the solution is about 1% to about 20% by weight.

6. The process of claim 1 wherein the extraction step using semi-coagulation, washing step, and a second extraction step using semi-coagulation are conducted in order to improve recovery of metal catalyst.

7. The process of claim 1 wherein polar solvents for the semi-coagulation are selected from water, methanol, ethanol, and isopropanol.

8. The process of claim 1 wherein the organic solvent is selected from a ketone or an ether.

9. The process of claim 8 wherein the ketone is selected from acetone, methyl ethyl ketone, diethyl ketone, and methyl isopropyl ketone.

10. The process of claim 5 wherein hydrogenated nitrile rubber contained in the solution is from about 2% to about 13% by weight.

11. The process of claim 5 wherein hydrogenated nitrile rubber contained in the solution is 4% to about 11% by weight.

12. The process of claim 1 wherein base nitrile rubber for the hydrogenated nitrile rubber is acrylonitrile-butadiene copolymer or acrylonitrile-acrylate-butadiene terpolymer.

13. A process for recovering a metal catalyst from hydrogenated nitrile rubber solution comprising: a chelation step using a chelating agent selected from a xanthate, a diothiocarbamate, or a trithiocarbonate compound; an extraction step using semi-coagulation; and an optional washing step using an organic solvent, wherein the metal catalyst is selected from a palladium, platinum, rhodium, or ruthenium catalyst; wherein the hydrogenated nitrile rubber solution is composed of hydrogenated nitrile rubber, metal catalyst, and an organic solvent; wherein the extraction step using semi-coagulation is obtained by a polar solvent to separate a metal catalyst-chelating agent complex from the hydrogenated nitrile rubber solution; wherein the hydrogenated nitrile rubber contained in the solution is about 1% to about 20% by weight; wherein the extraction step using semi-coagulation, washing step, and a second extraction step using semi-coagulation are conducted in order to improve recovery of metal catalyst; wherein the extraction step using semi-coagulation and washing step are simultaneous; wherein polar solvents for the semi-coagulation are selected from water, methanol, ethanol, and isopropanol; wherein the organic solvent is selected from a ketone or an ether; wherein the ketone is selected from acetone, methyl ethyl ketone, diethyl ketone, and methyl isopropyl ketone.

14. The process of claim 13, wherein the chelating agent has the chemical structure:

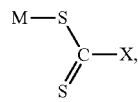

and wherein X is selected from the group consisting of —NR2, —OR, —SR; M is a counter ion; and R is alkyl group or benzyl group.

15. The process of claim 14, wherein the counter ion is selected from sodium, potassium, ammonium, or diethyl ammonium, and the alkyl group is selected from methyl, ethyl, butyl, or isobutyl.

* * * * *